(12) United States Patent
Buttini et al.

(10) Patent No.: US 11,540,521 B2
(45) Date of Patent: *Jan. 3, 2023

(54) PROCESS FOR THE PRODUCTION OF A SOFT BAKERY PRODUCT STORABLE AT ROOM TEMPERATURE

(71) Applicant: Barilla G. e R. Fratelli S.p.A, Parma (IT)

(72) Inventors: Roberto Buttini, Parma (IT); Corrado Ferrari, Parma (IT); Giancarlo Riboldi, Sorbolo (IT)

(73) Assignee: BARILLA G. E R. FRATELLI S.P.A., Parma (IT)

(*) Notice: Subject to any disclaimer, the term of this patent is extended or adjusted under 35 U.S.C. 154(b) by 207 days.

This patent is subject to a terminal disclaimer.

(21) Appl. No.: 15/416,231

(22) Filed: Jan. 26, 2017

(65) Prior Publication Data
US 2017/0215435 A1    Aug. 3, 2017

(30) Foreign Application Priority Data
Feb. 1, 2016 (IT) .................. 102016000010062

(51) Int. Cl.
*A21D 15/00* (2006.01)
*A21D 2/14* (2006.01)
*A23L 3/349* (2006.01)

(52) U.S. Cl.
CPC .............. *A21D 2/14* (2013.01); *A21D 15/00* (2013.01); *A23L 3/349* (2013.01)

(58) Field of Classification Search
USPC .................................................. 426/281, 283
See application file for complete search history.

(56) References Cited

U.S. PATENT DOCUMENTS 4,159,348 A * 6/1979 Dogliotti .............. A23G 3/2015
                                                                426/103
4,362,751 A   12/1982 Dogliotti
(Continued)

FOREIGN PATENT DOCUMENTS

EP    0666028 B1    10/2000
FR    1219260 A     5/1960
(Continued)

OTHER PUBLICATIONS

Pittia et al., "Ethanol activity in bakery products", International Food Information Service, 2004, XP-002758836. (Abstract).
(Continued)

*Primary Examiner* — Lien T Tran
(74) *Attorney, Agent, or Firm* — Lucas & Meranti, LLP

(57) ABSTRACT

A process for the production of a soft bakery product with a moisture content of at least 11%, which can be stored at room temperature for at least two months, while keeping its softness characteristics substantially unchanged is disclosed. The process includes the steps of: a) providing a semi-finished product obtained from a flour-based leavened dough; b) baking the semi-finished product in an oven, obtaining a bakery product having a moisture content of between 10% and 35% by weight; and c) injecting water or a hydroalcoholic solution into the product, in an amount such as to bring about an increase of at least 10% of the moisture content of the bakery product.

20 Claims, 1 Drawing Sheet

(56) References Cited

U.S. PATENT DOCUMENTS

| | | | | |
|---|---|---|---|---|
| 5,281,433 A * | 1/1994 | Gantwerker | ............ | A21D 8/06 |
| | | | | 426/19 |
| 2008/0248178 A1 * | 10/2008 | Offord | .................... | A21D 2/02 |
| | | | | 426/549 |
| 2012/0156326 A1 * | 6/2012 | Eijk | ...................... | A23L 3/3463 |
| | | | | 426/8 |

FOREIGN PATENT DOCUMENTS

| | | | |
|---|---|---|---|
| FR | 1481243 | A | 5/1967 |
| JP | 2000093075 | A | 4/2000 |
| WO | 2009097333 | A2 | 8/2009 |

OTHER PUBLICATIONS

Italian Search Report for Italian Application No. ITUB20160236 (2 Pages)(dated Oct. 14, 2016).

S.P. Cauvain, et al., "The Stability and Shelf Life of Bread and Other Bakery Products", Food and Beverage Stability and Shelf Life, pp. 658-682, 2011.

European Communication EP Application No. 17152967.0 dated Jun. 28, 2019.

* cited by examiner

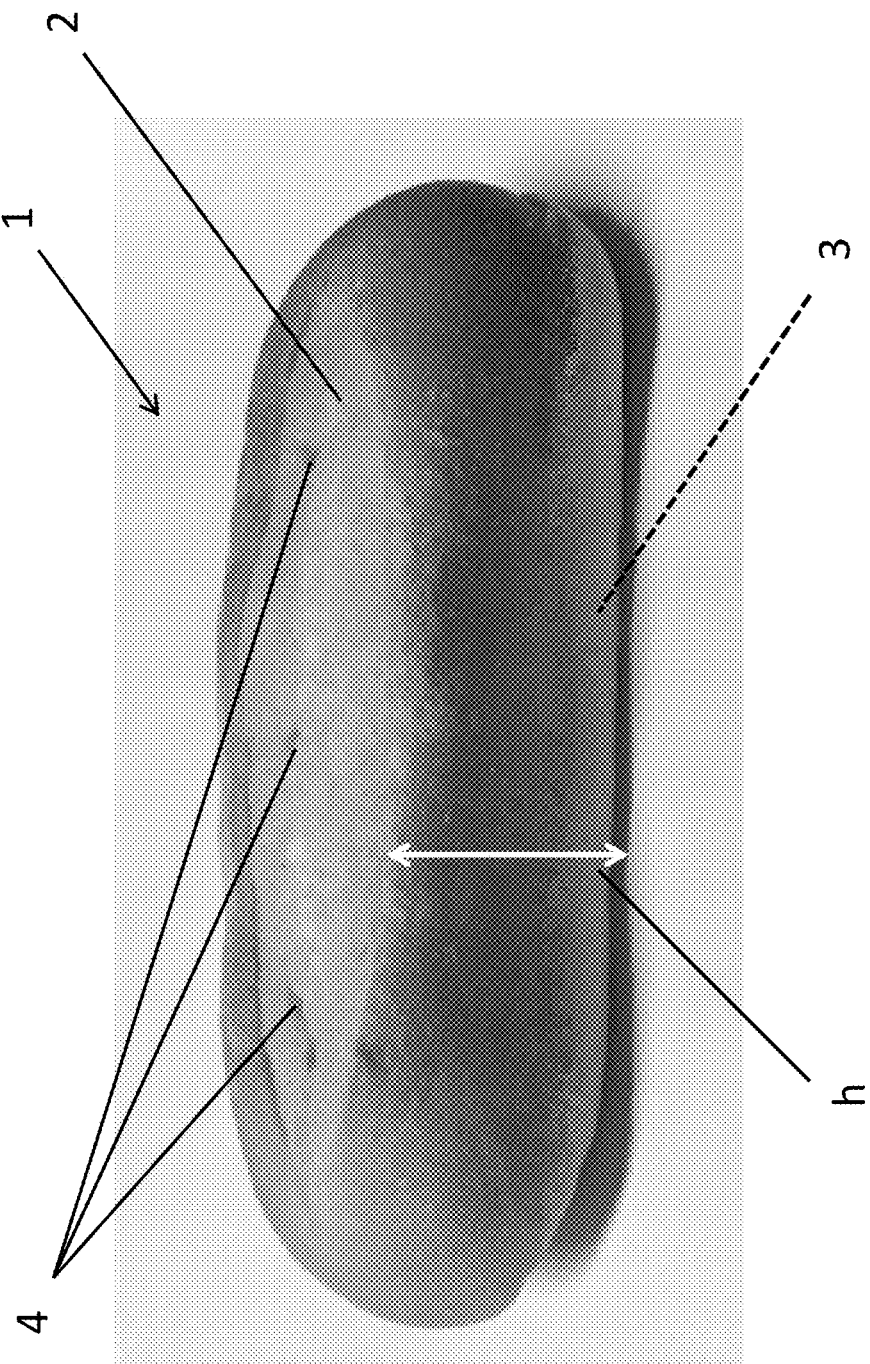

PROCESS FOR THE PRODUCTION OF A SOFT BAKERY PRODUCT STORABLE AT ROOM TEMPERATURE

CROSS-REFERENCE TO RELATED APPLICATIONS

This application claims the benefit of Italian Patent Application No. 102016000010062 filed Feb. 1, 2016, the contents of which are incorporated herein by reference.

FIELD OF APPLICATION

According to its more general aspect, the present invention relates to the food and confectionery industry.

In particular, the present invention relates to a process for production of soft bakery product, such as a brioche, croissant and the like, which can be stored at room temperature and is able to keep its softness characteristics for the entire storage period.

PRIOR ART

Soft bakery products such as brioches, croissants and the like, optionally filled with jam or cream, industrially produced and packaged so that they can be stored at shelf temperature for at least two months, have been known for many years.

These industrial products, which imitate brioches and croissants prepared using traditional methods, are generally popular with consumers because they offer the possibility of having a snack or nibble readily available at home, in the school or at the place of work. These products in fact maintain their optimum organoleptic and structural properties even after a relatively long period of storage at room temperature, in addition to being entirely safe from a microbiological point of view.

It has been noticed, however, that at the end of the storage period, the softness characteristics of these bakery products start to decline owing to redistribution of the water between an outer part of the product or the crust and the inner part, which results in gradual softening of the crust and gradual hardening of the inner part, and also because of the staling resulting from transfer of water between proteins and starch and retrogradation of the starch, whereby the starch recovers part of the crystalline structure of raw starch which was lost with gelatinization during baking. It is known, on the other hand, that an increase in the moisture content results in the perception of a greater freshness of the finished bakery product.

It has been attempted to solve this problem by modifying the composition of the starting ingredients of the bakery product by adding ingredients which are able to retain water, such as dietary fibers, pectins, alginates and similar polysaccharides. However, such addition worsens the characteristics of the dough, which becomes too tough and difficult to work, and in any case means that food additives are present in the final product, which is not to the liking of all consumers, many of whom prefer products without food additives, insofar as these additives are permitted by the existing regulations in the food sector.

Moreover, the aforementioned additives do not stably bond the water retained by them and, during storage, may release it to other components in the bakery product, such as the sugar, starch, any filling creams and chocolate, making the baked dough of the bakery product fibrous and dry.

The aforementioned drawbacks arise not only in the case of bakery products such as brioches and croissants, but also in the case of other "soft" bakery products, such as bread, special bread, focaccia, Danish pastries, cake batter products and sponge cake, whereby "soft" bakery product is understood as meaning a bakery product having a moisture content of at least 10%, preferably at least 20%.

The patent EP 0 666 028 B1 discloses a process for increasing the storage life of bread and bakery products in a modified atmosphere, involving injecting under aseptic conditions into the mass of the baked or partially baked bakery product a gas (carbon dioxide) or a mixture of gases (carbon dioxide+nitrogen or argon), so as to completely replace the air and saturate the product, and packaging the treated product in an airtight wrapper or bag. Water vapor or ethanol may be associated with the gas or gas mixture. Owing to the substantial elimination of the air contained in the cells of the bakery product by means of carbon dioxide, microbial proliferation is effectively prevented and retrogradation of the starch contained in the bakery product and its subsequent staling is slowed down, without having to incorporate additives into the product.

In the light of the prior art discussed above, the problem forming the basis of the present invention is to provide a soft bakery product which can be stored at room temperature, without the aid of food additives, and which keeps its softness characteristics as far as possible unchanged for a storage period at room temperature of at least one week, preferably at least for two months, without having to use modified-atmosphere packaging.

SUMMARY OF THE INVENTION

This problem has been solved, according to the invention, by a process for the production of a soft bakery product with a moisture content of at least 11%, which can be stored at room temperature, while keeping its softness characteristics substantially unchanged, comprising the steps of:

a) providing a semi-finished product obtained from a flour-based leavened dough;

b) baking said semi-finished product, obtaining a bakery product having a moisture content comprised between 10% and 35% by weight of the total weight of said bakery product;

c) injecting water or a hydroalcoholic solution into said product, in an amount such as to bring about an increase of at least 10% of the moisture content of said product.

The expression "storable at room temperature" or "which can be stored at room temperature" is understood as meaning that the bakery product, once packaged in a wrapper of food-grade plastic material, may be stored at shelf temperature for a period of at least one week and preferably at least two months, keeping unchanged its organoleptic and consistency properties, with particular regard to the softness characteristics, without the aid of a modified atmosphere.

The aforementioned hydroalcoholic solution is preferably a solution of ethyl alcohol in water with an amount of ethyl alcohol of up to 35% by weight of the total weight of the solution. Preferably this solution contains an amount of ethyl alcohol of between 0.1% and 35%, more preferably between 1% and 35%, conveniently between 5% and 15%, by weight of the total weight of the solution. A particularly advantageous hydroalcoholic solution is a solution of ethyl alcohol in water containing 7% by weight of ethyl alcohol relative to the total weight of the solution. Conveniently the hydroalcoholic solution is a hydroalcoholic solution of a flavoring for bakery products.

The moisture content of the aforementioned semi-finished product is preferably comprised between 18% and 30%.

Preferably, the ratio by weight between the water or the hydroalcoholic solution to be injected into the bakery product in said step c) and the latter product is comprised between 1:5 and 1:40, conveniently between 1:7 and 1:20.

The step c) of injecting water or a hydroalcoholic solution is preferably carried out by inserting a plurality of injectors into the bakery product, the aforementioned injectors being inserted at a level of between 1/10th and 9/10ths, preferably between 2/10ths and 7/10ths, of the height of the bakery product, where the height of the bakery product is understood as meaning the distance between the bottom surface of the bakery product and the top surface thereof, calculated from the bottom.

The aforementioned injectors may be inserted, in the top surface of the aforementioned bakery product, vertically from the top downwards to the aforementioned level.

Alternatively, the aforementioned injectors may be inserted horizontally into the bakery product at the aforementioned level. Obviously it is possible to insert the injectors also obliquely, provided that the insertion is performed at the aforementioned level.

The aforementioned injectors have conveniently the conventional form of a needle, and preferably are provided laterally with 1-4 holes having a diameter of between 0.5 and 4 mm, which holes are preferably at a distance of 1-50 mm from the tip of said needle, which, in a particularly preferred manner, does not have a hole.

Preferably, in the aforementioned step c) for injecting water or a hydroalcoholic solution, the bakery product has at its "core", namely in its central part, a temperature of 15°-95° C., advantageously 65°-95° C.

Advantageously, in the aforementioned step c) a solution of ethyl alcohol in water with an amount of alcohol up to 35%, preferably between 5% and 35%, by weight of the total weight of the solution, is injected.

Preferably in the aforementioned step c), an amount of water or of said hydroalcoholic solution is injected such as to determine an increase of 15-50% of the moisture content of said product.

The injection may be performed at a low pressure (pressure lower than or equal to 100 kPa) by means of electrovalves or at a high pressure (pressure higher than 100 kPa) by means of pumps.

Injection of the water or the hydroalcoholic solution in step c) of the process according to the invention may be carried out on the bakery product as soon as it leaves the oven, said product therefore having a temperature in its inner part of between 65° C. and 95° C. depending on the temperature at which it was baked in the oven, or on the bakery product which has been allowed to cool to room temperature or in any a case to a temperature of between 15° C. and 30° C.

When working at this latter temperature, in order to ensure that the final product is safe from a microbiological point of view, it is preferable to perform injection in an aseptic or at least protected environment.

Working in a protected environment is generally always advisable when water or a solution of ethyl alcohol in water with a relatively low content of ethyl alcohol (for example a few percentage units of ethyl alcohol) is used for injection according to step c) of the process. When, instead, a hydroalcoholic solution with a greater content of ethyl alcohol, for example about 5% or more by weight of ethyl alcohol relative to the weight of the solution, is used in a bakery product having a temperature of 65° C.-95° C. in its inner part, it is not necessary to work in a protected environment, because the ethyl alcohol provides a sufficient guarantee for the microbiological safety of the final product.

The injection of a hydroalcoholic solution containing at least 5% by weight of ethyl alcohol at a temperature of 65°-95° C. has the further advantage of causing an immediate vaporization of the ethyl alcohol, which is uniformly distributed within the cells of the bakery product, exercising its anti-microbial activity with maximum intensity and having also an inhibiting effect on retrogradation of the starch, thus slowing down the hardening process.

An inhibiting effect on retrogradation of the starch may however also be obtained by using, at the aforementioned temperature, a hydroalcoholic solution with an ethyl alcohol content less than 5% by weight of the weight of the solution.

The water (or the water of the hydroalcoholic solution) injected into the final bakery product according to the process of the present invention and distributed uniformly inside it effectively counteracts the loss of softness identified in the known industrial bakery products discussed further above and resulting from the aforementioned process of redistribution of the water between the inner part and the outer part of the bakery product during the storage period at shelf temperature.

Preferably, at the end of step c) of injecting water or hydroalcoholic solution and after optional cooling to room temperature, the bakery product is packaged in a wrapper of food-grade plastic material, thus being storable at room temperature for at least two months. Conveniently, the bakery product may be packaged without introducing a modified atmosphere.

According to one aspect thereof, the present invention relates to a method for keeping the softness characteristics of soft bakery products storable at room temperature substantially unchanged during the entire storage period thereof, which method comprises injecting an ethyl alcohol solution in water with an amount of ethyl alcohol up to 35%, by weight of the total weight of the solution, into said soft bakery products.

The aforementioned amount of ethyl alcohol is generally between 0.1% and 35%, preferably between 1% and 35%, more preferably between 5% and 15%, and advantageously equal to about 7%, by weight of the total weight of the solution.

The weight ratio between the ethyl alcohol solution and the bakery product is preferably comprised between 1:5 and 1:40, conveniently between 1:7 and 1:20.

The dough from which the semi-finished product according to step a) is obtained typically comprises soft grain flour, vegetable oils or fats, mono- and disaccharides, in particular sucrose, water, (natural or chemical) leavening agents and eggs.

This dough may also comprise further ingredients such as salt, mono- and diglycerides of fatty acids, malted barley flour, ascorbic acid, gluten and milk powder.

The features and advantages of the present invention will emerge more clearly from the description hereinbelow of a number of preferred embodiments, said description being provided by way of a non-limiting example.

BRIEF DESCRIPTION OF THE DRAWINGS

In the FIGURES:

FIG. 1 shows a perspective view of a bakery product according to the invention.

DETAILED DESCRIPTION

With reference to the process according to the invention, the semi-finished product for obtaining a soft dough bakery product provided in the first step of this process may be obtained by means of conventional processes known to the person skilled in the art.

In a non-limiting example, this semi-finished product consists of a flour-based raw dough and natural yeast, which is divided and formed into portions which are then processed until the desired form, for example an elongated form, typical of a small French loaf or stick, is obtained. In particular, once worked into an elongated form, the aforementioned spherical portions assume a length of between 100 mm and 120 mm.

Finally, the dough portions, thus formed are placed on a tray and leavened, for a time period of between 2 and 3 hours, at a temperature of between 33° C. and 37° C. and in an environment with a relative humidity of between 80% and 90% until a semi-finished product is obtained.

Then, the aforementioned semi-finished product is baked at a temperature of between 180° C. and 210° C., for a time period of between 9 and 11 minutes until a bakery product having a moisture content of between 22% and 24% by weight of the total weight of the bakery product, and a water activity (Aw) with value between 0.81 and 0.85, is obtained.

Thereafter, a hydroalcoholic solution is injected into said bakery product, when still hot, in an amount such as to raise the moisture content of said bakery product to a value of between 30% and 33% by weight of the total weight, with a water activity Aw of between 0.85 and 0.89.

In the step where a hydroalcoholic solution is injected, the bakery product has a temperature "at its core" of between 85° C. and 95° C.

In particular, the aforementioned step of injecting a hydroalcoholic solution is carried out by inserting a plurality of injectors into the bakery product, on its upper surface 6, said injectors being inserted vertically from the top downwards at a height of between 1/10th and 9/10ths, preferably between 2/10ths and 7/10ths, of the height h of the bakery product.

The height of the bakery product is understood as meaning the distance between the bottom surface of the bakery product and the top surface thereof, calculated from the bottom.

From FIG. 1 it can be noted that the insertion of the aforementioned injectors into the bakery product results in the formation of a plurality of holes 7 on the top surface 6 thereof. Moreover, during the aforementioned injection step, a more or less identical amount of hydroalcoholic solution is dispensed from each of the aforementioned injectors.

For example, if the aforementioned injection step were to be carried out by inserting three injectors into the bakery product with a total amount of 3 g of hydroalcoholic solution, firstly three holes would be formed on the top surface of the bakery product, then about 1 g of hydroalcoholic solution would be dispensed by each injector.

The injectors may also be inserted horizontally into the bakery product, provided that insertion is performed at a height of between 1/10th and 9/10ths, preferably between 2/10ths and 7/10ths, of the aforementioned height h of the bakery product.

It is important that the injectors should be inserted at the aforementioned height, because this ensures the uniform distribution of the hydroalcoholic solution in the baked dough of the bakery product.

The injectors have the form of a needle, provided laterally with 1-4 holes having a diameter of between 0.5 and 4 mm, which holes are preferably at a distance of 1-50 mm from the tip of said needle, which does not have a hole.

Injection of the hydroalcoholic solution may be performed at a low pressure (pressure lower than or equal to 100 kPa) by means of electrovalves or at a high pressure (pressure higher than 100 kPa) by means of pumps.

Example 1

Preparation of a bakery product using the process according to the invention.

Firstly a semi-finished product for a soft dough bakery product was prepared. It was obtained from a raw dough prepared using the following ingredients:

| Ingredient | Percentage (%) |
| --- | --- |
| Soft-wheat flour | 53 |
| Wheat gluten | 0.6 |
| Whole milk powder | 1 |
| Vegetable margarine | 6 |
| Fresh eggs | 8.6 |
| Brewer's yeast | 2.4 |
| Water | 15.5 |
| Salt | 0.6 |
| Mono- and diglycerides of fatty acids | 1.1 |
| Sucrose | 11.2 |

The percentages shown above are to be understood as being by weight relative to the total weight of the ingredients.

Using the aforementioned dough ingredients a dough was obtained by means of mixing in a fork kneader with a variable mixing speed. In particular, a slow mixing step was carried out for a period of 3 minutes, followed by a fast mixing step for a period of 20 minutes, in turn followed by a slow mixing step for a period of 4 minutes, so as to subject the dough to mixing for a total time of 27 minutes. Then the dough was divided up and formed into semi-spherical portions with a weight of 27 g. These semi-spherical portions were then worked so as to assume the oblong form typical of a small loaf with a length of about 105 mm.

Finally, the dough portions, thus formed, were placed on a tray and leavened for 155 minutes at a temperature of 35° C. in an environment with a relative humidity of 85% until a semi-finished product was obtained.

Then this semi-finished product was baked at a temperature of 195° C. for a period of 11 minutes. A soft dough bakery product in the form of a small loaf with a moisture content of 22.8% by weight, a water activity (Aw) of 0.84 and a weight of 24.5 g was thus obtained. Then 2.5 g of a hydroalcoholic flavoring solution, comprising 7% by weight of ethyl alcohol relative to the total weight of the solution, was injected into said bakery product, while said product was still hot (90° C.). A bread roll with a moisture content of 31.1% by weight, a water activity (Aw) of 0.86 and a weight of 27 g was thus obtained. Then the bakery product was allowed to cool for a period of 20 minutes until it reached a temperature of 24° C.

The aforementioned bakery products were packaged individually in sealed polypropylene wrappers and tested for their shelf life at room temperature.

After a period of two months no microbiological alterations or significant variations in the organoleptic properties of the products, and in particular no substantial modification of the softness characteristics, were determined.

Example 2

Croissant

| Dough ingredients | Percentage (%) |
|---|---|
| Type ""0"" soft-wheat flour | 60 |
| Fresh eggs | 19 |
| Castor sugar | 7 |
| Water | 7 |
| Mono- and diglycerides of fatty acids | 0.97 |
| Brewer's yeast | 2.5 |
| Butter | 2.5 |
| Salt | 1 |
| Bread improver | 0.03 |
| Total | 100 |
| Danish pastry ingredients | |
| Dough | 75 |
| Rolling margarine | 25 |
| Total | 100 |

The percentages shown above are to be understood as being by weight relative to the total weight of the ingredients.

The aforementioned ingredients for the dough were placed inside a double-spiral kneader, obtaining a homogeneous dough, which was then placed in an extruder, obtaining at its outlet a continuous sheet-like strip, which was then fed to a multi-roll rolling machine in order to reduce the thickness thereof.

16 layers of margarine were deposited on the sheet by means of the operations and the apparatus conventionally used to produce Danish pastry. From the sheet of Danish pastry finally triangular portions with a base of about 110 mm, a height of about 140 mm and a weight of about 45 g, were obtained. Then the triangular portions were rolled up to form semi-finished products in the forms of croissants and placed on baking trays.

The baking trays containing the aforementioned semi-finished products were introduced into a leavening chamber and kept inside it for 330 minutes at a temperature of 34° C. and with a relative humidity of 90%.

At the end of this period, the baking trays were transferred for a baking step in an oven at 190° for about 8 minutes.

The croissants thus obtained had a weight of about 38.5 g and a moisture content of about 18%.

Then 1.8 g of a hydroalcoholic flavoring solution, comprising 5.5% by weight of ethyl alcohol relative to the total weight of the solution, were injected into said croissant, while said product was still hot, more precisely at the temperature of 85° C. (temperature of the inner part). A croissant with a moisture content of 22% by weight and a weight of 40 g was thus obtained. The croissant was then allowed to cool for a period of 35 minutes until a temperature of 24° C. was reached. The croissants thus obtained were individually packaged in sealed polypropylene wrappers and tested for their shelf life at room temperature.

After a period 75 days no microbiological alterations or significant variations in the organoleptic characteristics of the products were noted and the softness characteristics remained substantially unvaried, as shown by the results of a panel test involving a comparison with croissants which were produced using the same ingredients and the same process and stored in the same way, but in which no hydroalcoholic solution was injected.

In this test 160 trained tasters were asked to assess, on a scale from 1 to 10, different organoleptic and structural characteristics of the croissants according to the present example and the comparison croissants mentioned above, using in both cases packaged products stored for two months at room temperature.

The following table shows the score obtained by the two types of croissant in question:

| Characteristics | Croissant (Example 2) | Comparison croissant (without injection of hydroalcoholic solution) |
|---|---|---|
| General appearance | 5.8 | 5.7 |
| Form | 5.8 | 5.7 |
| Overall color of the product | 6.1 | 5.8 |
| Color of the dough inside | 6.0 | 5.6 |
| Flavoring, general aroma | 5.9 | 5.4 |
| Consistency when tasted | 6.6 | 5.4 |
| Flavoring, general taste | 6.5 | 5.5 |

Finally, each taster was asked to give an overall evaluation of the two products, again on a scale of 1 to 10, and the average overall score was 6.5 for the croissant according to Example 2 and 5.6 for the comparison croissant.

It is clear that the injection of the hydroalcoholic solution resulted in an overall improvement of the organoleptic and structural properties compared to the croissants produced previously without the injection of the hydroalcoholic solution, there being a marked improvement in the softness characteristics, reflected by the higher score obtained for the parameter "consistency when tasted".

Example 3

| Dough ingredients | Percentage by weight (%) |
|---|---|
| Type "0" soft-wheat flour | 50 |
| Soft-wheat gluten | 0.4 |
| Egg yoke | 5.6 |
| Castor sugar | 10 |
| Water | 9 |
| Apricot yogurt | 9 |
| Mono- and diglycerides of alimentary fatty acids | 2 |
| Brewer's yeast | 1.5 |
| Margarine | 7 |
| Butter | 5 |
| Salt | 0.47 |
| Bread improver | 0.03 |
| Total | 100 |

Using the aforementioned ingredients, a dough was prepared and then rolled, resulting in a semi-finished product with 960 layers of dough.

Long strips, with a length of 900 mm, width of 28 mm, height of 12 mm and weight of 220 g were obtained from said semi-finished product.

The strips were then leavened at 30° C. for 240 minutes in an environment with a relative humidity of 85% and then baked in an oven at 190° C. for 15 minutes. The strips were then allowed to cool down to room temperature (about 30 minutes). At this point the strips had a moisture content of about 20%. Then 21 g of a hydroalcoholic flavoring solution, comprising 10% by weight of ethyl alcohol relative to the total weight of the solution, were injected into each strip. Strips with a moisture content of 27% and a weight of 215 g were thus obtained.

Thereafter, by means of conventional cutting operations, a longitudinal cut was performed so as to divide each strip into an upper portion and a lower portion.

The cut was carried out at a height of 1.2 cm (calculated from the bottom), the height of said strip being equal to about 2 cm.

Then 135 g of a milk cream with a moisture content of about 20%, a water activity Aw of 0.80 and 75° Brix was deposited onto the top surface of the bottom portion of the strip.

The top portions of each strip were then joined together again with the respective bottom portions, and the strip thus reassembled was subjected to transverse cutting operations, so as to obtain a plurality of filled snacks with a length of 100 mm, width of 45 mm, height of 25 mm and weight of about 35 g.

After a period of 75 days no microbiological alterations or major variations in the organoleptic properties of the products were noted and the softness characteristics remained substantially unchanged.

The invention claimed is:

1. A process for the production of a soft bakery product with a moisture content of at least 11%, said process comprising:
    a) providing a semi-finished product obtained from a flour-based leavened dough;
    b) baking said semi-finished product in an oven, obtaining a bakery product having a moisture content of between 10% and 35% by weight of the total weight of said bakery product; and
    c) injecting a hydroalcoholic solution of ethyl alcohol in water into said bakery product, in an amount of ethyl alcohol being 5% by weight or higher with respect to the total weight of the solution thereby bringing about an increase of at least 10% of the moisture content of said bakery product, wherein said bakery product has a temperature of 65° to 95° C. in a central part during injection thereby facilitating immediate vaporization of the ethyl alcohol and uniform distribution within the cells of said bakery product, and whereby the injected bakery product is storable at room temperature, while keeping its softness characteristics substantially unchanged, and whereby the injected hydroalcoholic solution provides anti-microbial activity to the bakery product after baking and during storage.

2. The process according to claim 1, wherein in said step c) said ethyl alcohol is present in an amount from 5% to 35%, by weight of the total weight of the solution.

3. The process according to claim 2, wherein said hydroalcoholic solution is a solution of ethyl alcohol in water with an amount of ethyl alcohol of between 5% and 15%.

4. The process according to claim 3, wherein said hydroalcoholic solution is a solution of ethyl alcohol in water with an amount of ethyl alcohol of about 7% by weight of the total weight of the solution.

5. The process according to claim 2, wherein said hydroalcoholic solution contains a bakery product flavor.

6. The process according to claim 2, wherein the weight ratio between the hydroalcoholic solution to be injected into the bakery product in said step c) and the bakery product is between 1:5 and 1:40.

7. The process according to claim 6, wherein the weight ratio between the hydroalcoholic solution to be injected into the bakery product in said step c) and the bakery product is comprised between 1:7 and 1:20.

8. The process according to claim 1, wherein said step c) of injecting water or a hydroalcoholic solution is carried out by inserting a plurality of injectors into the bakery product, said injectors being inserted at a level of between $1/10$th and $9/10$ths of a height of the bakery product.

9. The process according to claim 8, wherein said injectors are inserted at a level of between $2/10$ths and $7/10$ths, of the height of a bakery product.

10. The process according to claim 8, wherein said injectors are inserted, in the top surface of said bakery product, vertically from the top downwards to said level.

11. The process according to claim 8, wherein said injectors are inserted horizontally into said bakery product at said level.

12. The process according to claim 8, wherein said injectors have the shape of a needle, which is laterally provided with 1-4 holes with a diameter of between 0.5 and 4 mm.

13. The process according to claim 12, wherein said side holes are at a distance of 1-50 mm from the tip of said needle.

14. The process according to claim 1, wherein in said step c) an amount of said hydroalcoholic solution is injected such as to determine an increase of 15-50% of the moisture content of said bakery product.

15. The process according to claim 1, wherein said bakery product, at the end of said step c) of injecting said hydroalcoholic solution and after optional cooling to room temperature, is packaged in a wrapper of food-grade plastic material, thus being storable at room temperature for at least two months.

16. The process according to claim 15, wherein said bakery product is packaged in a wrapper of food-grade plastic material without introducing a modified atmosphere.

17. A method for keeping the softness characteristics of soft bakery products storable at room temperature substantially unchanged during the entire storage period thereof, comprising:
    injecting into central portions of said soft bakery products, having a temperature of 65° to 95° C. in said central portions, a hydroalcoholic solution of ethyl alcohol and water with an amount of ethyl alcohol 5% to 35%, by weight of the total weight of the solution, into said soft bakery products thereby facilitating immediate vaporization of the ethyl alcohol and uniform distribution within the cells of said bakery product, and whereby the injected hydroalcoholic solution provides anti-microbial activity to the soft bakery products after baking and during storage while maintaining said softness characteristics of soft bakery products.

18. The method according to claim 17, wherein said amount of ethyl alcohol is between 5% and 15%, by weight of the total weight of the solution.

19. The method according to claim 17, wherein the weight ratio between the ethyl alcohol solution and the bakery product is between 1:5 and 1:40.

20. The method according to claim 18, wherein the weight ratio between the ethyl alcohol solution and the bakery product is between 1:7 and 1:20.

* * * * *